US010676576B2

(12) United States Patent
Zhou et al.

(10) Patent No.: US 10,676,576 B2
(45) Date of Patent: Jun. 9, 2020

(54) PROCESS FOR PREPARING CELLULOSE SOLUTION AND EQUIPMENT THEREFOR

(71) Applicant: CHINA TEXTILE ACADEMY, Chaoyang District, Beijing (CN)

(72) Inventors: Yun'an Zhou, Beijing (CN); Yushan Sun, Beijing (CN); Genli Wang, Beijing (CN); Chunzu Cheng, Beijing (CN); Zhenxing Wu, Beijing (CN); Kedong Chi, Beijing (CN); Songxin Hou, Beijing (CN); Yu Pang, Beijing (CN)

(73) Assignee: CHINA TEXTILE ACADEMY, Beijing (CN)

( * ) Notice: Subject to any disclaimer, the term of this patent is extended or adjusted under 35 U.S.C. 154(b) by 62 days.

(21) Appl. No.: 15/577,945

(22) PCT Filed: May 10, 2016

(86) PCT No.: PCT/CN2016/081488
§ 371 (c)(1),
(2) Date: Nov. 29, 2017

(87) PCT Pub. No.: WO2016/192512
PCT Pub. Date: Dec. 8, 2016

(65) Prior Publication Data
US 2018/0134851 A1    May 17, 2018

(30) Foreign Application Priority Data

Jun. 1, 2015 (CN) .......................... 2015 1 0293004

(51) Int. Cl.
| *C08J 3/09* | (2006.01) |
| *D01D 1/02* | (2006.01) |
| *D01F 2/00* | (2006.01) |
| *D21C 9/00* | (2006.01) |
| *D21C 9/08* | (2006.01) |
| *D21C 9/18* | (2006.01) |
| *D21H 11/20* | (2006.01) |

(52) U.S. Cl.
CPC ................ *C08J 3/096* (2013.01); *D01D 1/02* (2013.01); *D01F 2/00* (2013.01); *D21C 9/005* (2013.01); *D21C 9/007* (2013.01); *D21C 9/086* (2013.01); *D21C 9/18* (2013.01); *D21H 11/20* (2013.01); *C08J 2301/02* (2013.01)

(58) Field of Classification Search
CPC ......... C08J 3/096; C08J 2301/02; D01D 1/02; D01F 2/00; D21C 9/005; D21C 9/007; D21C 9/18; D21C 9/086; D21H 11/20
See application file for complete search history.

(56) References Cited

U.S. PATENT DOCUMENTS 5,603,883 A    2/1997    Zikeli

FOREIGN PATENT DOCUMENTS

| CN | 1157012 A | 8/1997 |
| CN | 1468889 A | 1/2004 |
| CN | 1635203 A | 7/2005 |
| CN | 1981075 A | 6/2007 |
| CN | 101435114 A | 5/2009 |
| CN | 105037753 A | 11/2015 |
| DE | 4441468 A1 | 5/1996 |
| WO | WO 2005/116309 A1 | 12/2005 |

OTHER PUBLICATIONS

International Search Report (PCT/ISA/210) dated Jul. 21, 2016, by the Chinese Patent Office as the International Searching Authority for International Application No. PCT/CN2016/081488.

*Primary Examiner* — Patrick D Niland
(74) *Attorney, Agent, or Firm* — Buchanan Ingersoll & Rooney PC

(57) ABSTRACT

The present invention provides a process for preparing a cellulose solution. NMMO with a relatively low concentration and non-activated pulp are continuously mixed online, the mixed premix is dewatered in evaporation dewatering equipment until an NMMO concentration suitable for swelling is achieved, then, sufficient swelling is carried out under this condition, and the uniformly-mixed and sufficiently swelled pre-swelling solution is subjected to depressurized evaporation dewatering and dissolving by thin-film-evaporation equipment thereby obtaining a high-concentration, uniformly-dissolved and excellently-uniformity cellulose solution. The present invention further provides continuous preparation equipment for the process for preparing a cellulose solution. According to the present invention, the conflict between uniform mixing and sufficient swelling during the preparation of a high-concentration cellulose solution is solved, and problems in storage and transportation safety caused by using high concentration NMMO in the conventional technologies are prevented.

10 Claims, 1 Drawing Sheet

PROCESS FOR PREPARING CELLULOSE SOLUTION AND EQUIPMENT THEREFOR

TECHNICAL FIELD

The present invention belongs to a field of cellulose and particularly relates to a process for preparing a cellulose solution and equipment for the process.

BACKGROUND

Cellulose fibers are favored by people due to characteristics of renewable raw material, excellent performance, extensive application and so on. However, processing technologies of cellulose fiber are still dominated by the traditional viscose method at present. The pollution to environments caused by the processes during production is gradually taken into account by people, thus, a green and environment-friendly processing technology is urgently needed to be developed. In the 90s of last century, a processing technology, which prepares a stock solution by directly dissolving cellulose with an organic solvent, i.e., N-methylmorpholine-N-oxide (NMMO) and then carries out spinning, thoroughly solves the problem of environmental pollution of the viscose method. And fibers prepared by this technology are named Lyocell fibers by BISFA (The International Bureau for Standardization of Man-made Fibers).

During the process of preparing Lyocell fibers through dissolving cellulose with an NMMO aqueous solution, the swelling and dissolving processes of cellulose by NMMO and effects are directly related to stability of spinning and performances of final products. And the concentration of a spinning solution and whether a technical process is energy-saving or not are directly related to the economic benefit of the process technology. Given the importance of the stock solution for spinning during the preparation of the lyocell fibers, an energy-saving and efficient method for preparing a well-distributed high-concentration cellulose stock solution for spinning is urgently needed.

During the preparation of a cellulose solution, several stages, i.e., mixing, swelling and dissolving of pulp and NMMO are required to be carried out in different devices. And in view of the several stages and the whole process of swelling and dissolving, different methods of swelling and dissolving and devices are described in different patents.

In preparation methods of Lyocell fiber disclosed by CN1635203A, CN1981075A and CN1635203A, pulp is all activated by activating enzyme and is mixed with NMMO and is swelled, and then is dewatered under decompression and is dissolved to obtain the solution for spinning.

A method for preparing a cellulose solution is disclosed by CN1468889A and is characterized in that a cellulose solution is prepared from cellulose powder with a diameter of not exceeding 1000 um and NMMO with a concentration of 88% through heating, mixing, kneading, dissolving and homogenizing in a twin-screw extruder.

A device for producing cellulose films and fibers and an integrated plant are disclosed by CN1157012A, wherein the preparation of a cellulose solution is carried out by two thin-film-evaporation devices which are connected in series and used for carrying out depressurizing and heating on a liquid mixture of pulp and NMMO to achieve swelling and dissolving respectively, thereby obtaining the cellulose solution.

For major existing methods for preparing a cellulose solution, pulp can be activated or non-activated. And solvents can have a high concentration or a certain concentration, and mixing, swelling and dissolving processes for the pulp and the solvent can be implemented separately or completed in the same equipment. At present, disclosed and industrially-implemented methods, such as CN1635203A, CN1981075A and CN1635203A all adopt high-concentration NMMO (80% to 86.7%) and activated pulp, and comprise the steps of carrying out mixing and swelling in mixing equipment and then carrying out dissolving by thin-film-evaporation equipment.

Although the generation of gel particles can be reduced to some extent, the activated pulp introduces a large volume of moisture, the problem of energy consumption caused by repeated evaporation is caused, and certain security risks are present in links such as evaporation, storage and delivery of high-concentration solvents. If crushed ordinary pulp and high-concentration NMMO are used and subjected to mixing, swelling and dissolving in a screw extruder, the problem of moisture introduction during activation can be prevented, but the requirements on crushed particle size are too high, large-scale implementation is difficult, and the problem of dust pollution during crushing is also difficult to avoid.

In addition, if high-concentration NMMO suitable for swelling is used, the problems of high swelling degree and relatively low liquor ratio exist during mixing and swelling, and it is difficult to prepare a high-concentration (12% to 15%) homogeneous solution for spinning. By adopting a method of mixing NMMO of a certain concentration with pulp and performing swelling and dissolving of the pulp by two thin film evaporators respectively, NMMO with a relatively low concentration is used in theory, and the problem of poor uniformity caused by insufficient liquor ratio during the preparation of a high-concentration solution for spinning can be effectively solved. However, during actual implementation of this method, problems that films are difficult to form in a liquid mixture, and a phase splitting occurs as a solid phase falls off and a liquid phase flows down along a wall are present when the liquid mixture is subjected to depressurized dewatering and swelling in a first-stage thin-film evaporation device, so that the uniformity of a pre-dissolved solution is difficult to guarantee.

SUMMARY

The present invention aims at improving existing mixing, swelling and dissolving processes of cellulose, to solve the problems of a conflict between uniform mixing and sufficient swelling and energy consumption during the mixing, swelling and dissolving processes of high-concentration NMMO and activated pulp in the technological process in the prior art, and to prepare a high-concentration homogeneous solution for spinning from NMMO with a relatively low concentration and non-activated pulp in an online and continuous manner.

A technical scheme of the present invention is as follows:

A process for preparing a cellulose solution comprises the following steps:

(1) uniformly mixing cellulose pulp and an NMMO aqueous solution with a temperature of 70° C. to 100° C. to obtain a premix, wherein a mass of the NMMO aqueous solution is 5 to 10 times that of the cellulose pulp, and the NMMO aqueous solution has a water/NMMO mass ratio in a range from of 28:72 to 60:40;

(2) subjecting the premix to dewatering by evaporation to obtain a pre-swelling solution, wherein the pre-swelling solution has a water/NMMO mass ratio in a range from 16:84 to 28:72;

(3) subjecting the pre-swelling solution to heat preservation in a swelling kettle for sufficient swelling to obtain a swelled solution; and (4) subjecting the swelled solution to dewatering by depressurized evaporation and dissolving to obtain the cellulose solution.

The cellulose pulp is dry-cut pulp or dry-torn pulp and may also be wet-crushed pulp. And the variety of the cellulose pulp comprises, but not limited to, one or more of wood pulp, bamboo pulp and cotton pulp.

According to the present invention, NMMO with a relatively low concentration and non-activated pulp are continuously mixed online, the mixed premix is dewatered in evaporation dewatering equipment until an NMMO concentration suitable for swelling is achieved, then, sufficient swelling is carried out under the conditions, and the uniformly-mixed and sufficiently-swelled pre-swelling solution is subjected to dewatering by depressurized evaporation and dissolving by thin-film-evaporation equipment, thereby obtaining a uniformly-dissolved and excellent-uniformity cellulose solution with a concentration in a range from 12% to 15%.

In process of research, researchers of the present invention found out that through mixing a relatively-low-concentration NMMO aqueous solution in a range from 70° C. to 100° C. with the cellulose pulp, the cellulose pulp can be rapidly and uniformly dispersed in the NMMO aqueous solution, the uniformity of mixing of the pulp and the NMMO solution is guaranteed, and a foundation is settled for sufficiently swelling and dissolving of the cellulose pulp. However, in NMMO aqueous solutions with a relatively low concentration, the swelling of the cellulose pulp is insufficient. The NMMO concentration is increased to a range suitable for swelling through dewatering by depressurized evaporation in the present invention, the cellulose pulp is swelled sufficiently in a shorter time at a lower temperature, and the production of the cellulose solution in continuous large-scale is facilitated.

By adopting the technological process, the uniformity of mixing and the sufficiency of swelling are effectively guaranteed, the conflict between uniform mixing and sufficient swelling during the preparation of a high-concentration cellulose solution is solved, the generation of a great quantity of gel particles during dissolving is prevented, the spinning stability of the cellulose solution is improved, and the pressure of spinning filtering equipment is alleviated. And by using non-activated pulp, the problem of energy consumption resulting from repeated evaporation is prevented.

In the step (1), the NMMO aqueous solution has a water/NMMO mass ratio in a range from 28:72 to 50:50.

Preferably, in the step (1), the NMMO aqueous solution has a water/NMMO mass ratio in a range from 28:72 to 35:65.

In the step (2), the pre-swelling solution has a water/NMMO mass ratio in a range from 18:82 to 27:73.

Preferably, in the step (2), the pre-swelling solution has a water/NMMO mass ratio in a range from 19:81 to 25:75.

In the step (1), the mass of the NMMO aqueous solution is 8 to 10 times that of the cellulose pulp and the NMMO aqueous solution has a temperature of 80° C. to 90° C.

In the step (1), a process for uniformly mixing of the cellulose pulp and the NMMO aqueous solution comprises adding the cellulose pulp and the NMMO aqueous solution into continuous mixing equipment and carrying out continuous mixing for 5 min to 30 min at a stirring linear speed in a range from 60 m/min to 180 m/min.

In the step (2), a process for dewatering by evaporation dewatering is carried out at through dewatering by depressurized evaporation at a dewatering temperature of 80° C. to 110° C. under a dewatering pressure of 4 kPa to 10 kPa.

By adopting dewatering by depressurized evaporation, the dewatering temperature can be lowered, the dewatering efficiency can be increased, and the continuous proceeding of whole preparation of cellulose solution is facilitated.

In the step (3), the pre-swelling solution is sufficiently swelled in a temperature in a range from 55° C. to 95° C. for a residence time in a range from 3 min to 60 min to obtain a swelled solution inside the swell kettle.

Preferably, in the step (3), the pre-swelling solution is sufficiently swelled in a temperature in a range from 65° C. to 95° C. for a residence time in a range from 10 min to 45 min to obtain a swelled solution inside the swell kettle.

More preferably, in the step (3), the pre-swelling solution is sufficiently swelled in a temperature in a range from 75° C. to 85° C. for a residence time in a range from 15 min to 30 min to obtain a swelled solution inside the swell kettle.

Swelling equipment adopted in the present invention for pre-swelling is a horizontal flow stirring type swelling kettle, so that the cellulose pulp has the same swelling residence time, the continuous preparation of the cellulose solution is facilitated, and the prepared swelled solution is sufficiently and uniformly swelled.

In the step (4), a process for dewatering by depressurized evaporation and dissolving is thin-film-evaporation dewatering and dissolving, and is carried out at a dewatering temperature in a range from 100° C. to 150° C. under a dewatering pressure in a range from 4 kPa to 10 kPa at a thin-film wiping linear speed in a range from 2 m/s to 6 m/s.

Continuous preparation equipment for a cellulose solution comprises continuous feeding equipment, a continuous mixer, continuous depressurizing and heating equipment, a swelling kettle and thin-film-evaporation dissolving equipment which are connected sequentially through a pipeline, wherein the continuous feeding equipment comprises a continuous pulp charging device and a continuous NMMO aqueous solution charging device, and the continuous pulp charging device and the continuous NMMO aqueous solution charging device are respectively connected to feeding sections of the continuous mixer.

The continuous mixer is equipment with a continuous mixing function, such as a single-shaft continuous mixer, a twin-shaft continuous mixer or a twin-screw kneading-type continuous mixer, and can be used for rapidly and sufficiently mixing of NMMO and cellulose pulp, and a premix is obtained after mixing.

The continuous depressurizing and heating equipment is selected from a continuous mixer equipped with a vacuum heating device.

The continuous depressurizing and heating equipment can be used for further intensively stirring and mixing of the premix. A stirring component of the equipment can be used for heating the premix through a contact face and the premix is subjected to dewatering by depressurized evaporation under certain vacuum until a predetermined volume of moisture is evaporated, so that a concentration of NMMO reaches an optimal swelling concentration range, and a pre-swelling solution is obtained.

The swelling kettle enables the pre-swelling solution, of which the concentration of NMMO reaches the optimal swelling concentration range, to be sufficiently swelled at a proper temperature after a certain residence time, and the pre-swelling solution is converted into the swelled solution. The swelling kettle is provided with a horizontal flow type stirring device, so that the liquid mixture is first-in and first-out and has the same swelling residence time, and the temperature of an outer jacket (internal wall) of the swelling kettle can be regulated and controlled through a heat medium.

The thin-film-evaporation dissolving equipment is vertical type thin-film-evaporation dissolving equipment, and the swelled solution can be spread on the surface of a vertical type internal wall of the thin-film-evaporation dissolving equipment to form a thin layer shape, and is further dewatered under proper temperature and vacuum conditions and converted into a cellulose solution with a concentration of 10% to 15%.

The continuous preparation equipment for the cellulose solution, provided by the present invention, further comprises molding equipment, wherein the molding equipment can be used for converting the cellulose solution for spinning into products such as fibers, films and nonwoven fabrics.

The continuous preparation equipment for the cellulose solution further comprises a storage kettle and a first conveying pump, wherein the storage kettle and the first conveying pump are successively arranged on a pipeline between the continuous mixer and the continuous depressurizing and heating equipment.

The continuous preparation equipment for the cellulose solution further comprises a second conveying pump, wherein the second conveying pump is arranged on a pipeline between the swelling kettle and the thin-film-evaporation dissolving equipment.

The present invention discloses a process for preparing a cellulose solution and equipment for the process. According to the present invention, a continuous charging mode is adopted, a low-concentration NMMO aqueous solution is premixed with cellulose pulp, additives, etc. in mixing equipment, then, the premix enters horizontal-type continuous depressurizing and heating equipment and is subjected to depressurized dewatering, to enable the NMMO concentration to reach an optimal swelling concentration range. And the cellulose pulp is sufficiently swelled for a certain time at a certain temperature, and then, dewatering and dissolving are further carried out in a vertical type thin-film evaporator by adopting a thin-film evaporation technology to form a solution with good process ability.

Compared with the prior art, the process for preparing the cellulose solution, disclosed by the present invention, has the advantages that the conflict between uniform mixing and sufficient swelling during the preparation of a high-concentration cellulose solution is solved, and uniform mixing and sufficient swelling are both achieved.

By using low-concentration NMMO, problems in storage and transportation safety caused by using high-concentration NMMO in the conventional technologies are prevented.

The pulp used is not required to be activated, so that the problem of energy consumption resulting from repeated evaporation caused by a large volume of moisture introduced by activation is avoided.

Therefore, compared with the prior art, the method provided by the present invention has the advantages that the prepared solution is more uniform, the entire technological process is safer, more energy-saving and more efficient, and industrial continuous production is facilitated.

The cellulose solution prepared by the process of the present invention has a higher concentration in a range from 12% to 15%, the solution is uniform and is excellent in uniformity, gel particles are small in particle size and narrow in particle size distribution. Spinning is carried out with a draft multiple of 5 to prepare fibers, the spinning stability is excellent, and broken ends are absent in a period of spinning time of 2 hours. The cellulose solution prepared by the process is suitable for producing products such as cellulose fibers, cellulose films and non-woven fabrics and has extremely extensive market application prospects.

REFERENCE SIGNS

Figure 1:
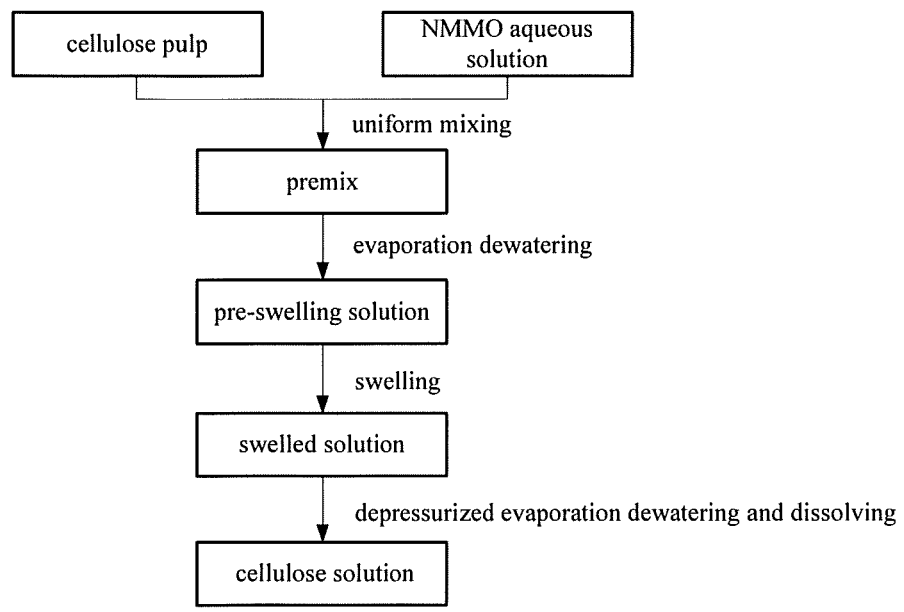
FIG. 1 is a flow diagram of a process of the present invention.

| | |
|---|---|
| 1. continuous pulp charging device | 2. continuous NMMO aqueous solution charging device |
| 3. continuous mixer | 4. continuous depressurizing and heating equipment |
| 5. swelling kettle | 6. thin-film-evaporation dissolving equipment |
| 7. molding equipment | 8. vacuum device |

DETAILED DESCRIPTION

Embodiment 1

(1) 20 kg of cellulose pulp (dry-cut pulp COSMO DP500, moisture content 6%) and 167 kg of NMMO aqueous solution of 70° C. were continuously added into a continuous mixer 3 through a continuous pulp charging device 1 and a continuous NMMO aqueous solution charging device 2 respectively, and were stirred for 30 min in the continuous mixer 3 at a stirring linear speed of 60 m/min to be uniformly mixed to obtain a premix. The NMMO aqueous solution had a water/NMMO mass ratio of 28:72.

(2) The premix was continuously pumped into continuous depressurizing and heating equipment 4 and was subjected to dewatering by depressurized evaporation to obtain a pre-swelling solution. In the continuous depressurizing and heating equipment 4, a dewatering pressure was 6 kPa and a dewatering temperature was 105° C. And the pre-swelling solution at an outlet of the continuous depressurizing and heating equipment 4 had a water/NMMO mass ratio of 19:81.

(3) The pre-swelling solution was continuously fed into a swelling kettle 5. The pre-swelling solution was sufficiently swelled in the temperature of 80° C. for the residence time of 15 min inside the swelling kettle to obtain a swelled solution.

(4) The swelled solution was continuously pumped into thin-film-evaporation dissolving equipment 6 and was subjected to dewatering by depressurized evaporation and dissolving to obtain a cellulose solution with a cellulose concentration of 12%. In the thin-film-evaporation dissolving equipment 6, a dewatering temperature was 100° C., a dewatering pressure was 4 kPa and a thin-film wiping speed was 2 m/s.

Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 2

(1) 20 kg of cellulose pulp (dry-cut pulp bamboo pulp DP500, moisture content 6%) and 200 kg of NMMO aqueous solution of 85° C. were continuously added into a continuous mixer 3 through a continuous pulp charging device 1 and a continuous NMMO aqueous solution charging device 2 respectively, and were stirred for 20 min in the continuous mixer 3 at a stirring linear speed of 120 m/min to be uniformly mixed to obtain a premix. The NMMO aqueous solution had a water/NMMO mass ratio of 40:60.

(2) The premix was continuously pumped into continuous depressurizing and heating equipment 4 and was subjected to dewatering by depressurized evaporation to obtain a pre-swelling solution. In the continuous depressurizing and heating equipment 4, a dewatering pressure was 4 kPa and a dewatering temperature was 110° C. And the pre-swelling solution at an outlet of the continuous depressurizing and heating equipment 4 had a water/NMMO mass ratio of 21:79.

(3) The pre-swelling solution was continuously fed into a swelling kettle 5. The pre-swelling solution was sufficiently swelled in the temperature of 85° C. for the residence time of 30 min inside the swelling kettle to obtain a swelled solution.

(4) The swelled solution was continuously pumped into thin-film-evaporation dissolving equipment 6 and was subjected to dewatering by depressurized evaporation and dissolving to obtain a cellulose solution with a cellulose concentration of 12%. In the thin-film-evaporation dissolving equipment 6, a dewatering temperature was 120° C., a dewatering pressure was 6 kPa and a thin-film wiping speed was 4 m/s.

Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 3

(1) 20 kg of cellulose pulp (dry-cut pulp cotton pulp DP500, moisture content 6%) and 168 kg of NMMO aqueous solution of 90° C. were continuously added into a continuous mixer 3 through a continuous pulp charging device 1 and a continuous NMMO aqueous solution charging device 2 respectively, and were stirred for 5 min in the continuous mixer 3 at a stirring linear speed of 180 m/min to be uniformly mixed to obtain a premix. The NMMO aqueous solution had a water/NMMO mass ratio of 35:70.

(2) The premix was continuously pumped into continuous depressurizing and heating equipment 4 and was subjected to dewatering by depressurized evaporation to obtain a pre-swelling solution. In the continuous depressurizing and heating equipment 4, a dewatering pressure was 4 kPa and a dewatering temperature was 80° C. And the pre-swelling solution at an outlet of the continuous depressurizing and heating equipment 4 had a water/NMMO mass ratio of 25:75.

(3) The pre-swelling solution was continuously fed into a swelling kettle 5. The pre-swelling solution was sufficiently swelled in the temperature of 55° C. for the residence time of 60 min inside the swelling kettle to obtain a swelled solution.

(4) The swelled solution was continuously pumped into thin-film-evaporation dissolving equipment 6 and was subjected to dewatering by depressurized evaporation and dissolving to obtain a cellulose solution with a cellulose concentration of 13%. In the thin-film-evaporation dissolving equipment 6, a dewatering temperature was 150° C., a dewatering pressure was 10 kPa and a thin-film wiping speed was 3 m/s.

Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 4

(1) 20 kg of cellulose pulp (dry-cut pulp COSMO DP450, moisture content 6%) and 100 kg of NMMO aqueous solution of 100° C. were continuously added into a continuous mixer 3 through a continuous pulp charging device 1 and a continuous NMMO aqueous solution charging device 2 respectively, and were stirred for 15 min in the continuous mixer 3 at a stirring linear speed of 120 m/min to be uniformly mixed to obtain a premix. The NMMO aqueous solution had a water/NMMO mass ratio of 45:55.

(2) The premix was continuously pumped into continuous depressurizing and heating equipment 4 and was subjected to dewatering by depressurized evaporation to obtain a pre-swelling solution. In the continuous depressurizing and heating equipment 4, a dewatering pressure was 4 kPa and a dewatering temperature was 90° C. And the pre-swelling solution at an outlet of the continuous depressurizing and heating equipment 4 had a water/NMMO mass ratio of 22:78.

(3) The pre-swelling solution was continuously fed into a swelling kettle 5. The pre-swelling solution was sufficiently swelled in the temperature of 95° C. for the residence time of 3 min inside the swelling kettle to obtain a swelled solution.

(4) The swelled solution was continuously pumped into thin-film-evaporation dissolving equipment 6 and was subjected to dewatering by depressurized evaporation and dissolving to obtain a cellulose solution with a cellulose concentration of 15%. In the thin-film-evaporation dissolving equipment 6, a dewatering temperature was 120° C., a dewatering pressure is 6 kPa and a thin-film wiping speed was 6 m/s.

Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 5

(1) 25 kg of cellulose pulp (wet-powder pulp COSMO DP500, moisture content 25%) and 167 kg of NMMO aqueous solution of 85° C. were continuously added into a continuous mixer 3 through a continuous pulp charging device 1 and a continuous NMMO aqueous solution charging device 2 respectively, and were stirred for 30 min in the continuous mixer 3 at a stirring linear speed of 120 m/min to be uniformly mixed to obtain a premix. The NMMO aqueous solution had a water/NMMO mass ratio of 28:72.

(2) The premix was continuously pumped into continuous depressurizing and heating equipment 4 and was subjected to dewatering by depressurized evaporation to obtain a pre-swelling solution. In the continuous depressurizing and heating equipment 4, a dewatering pressure was 5 kPa and a dewatering temperature was 105° C. And the pre-swelling solution at an outlet of the continuous depressurizing and heating equipment 4 had a water/NMMO mass ratio of 20:80.

(3) The pre-swelling solution was continuously fed into a swelling kettle 5. The pre-swelling solution was sufficiently swelled in the temperature of 80° C. for the residence time of 25 min inside the swelling kettle to obtain a swelled solution.

(4) The swelled solution was continuously pumped into thin-film-evaporation dissolving equipment 6 and was subjected to dewatering by depressurized evaporation and dissolving to obtain a cellulose solution with a cellulose concentration of 12%. In the thin-film-evaporation dissolving equipment 6, a dewatering temperature was 130° C., a dewatering pressure was 10 kPa and a thin-film wiping speed was 4 m/s.

Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 6

A process for preparing a cellulose solution comprises the following steps:

(1) Cellulose pulp and an NMMO aqueous solution of 70° C. were uniformly mixed to obtain a premix, wherein the mass of the NMMO aqueous solution was 5 times that of the cellulose pulp, and the NMMO aqueous solution had a water/NMMO mass ratio of 60:40.

(2) The premix was subjected to dewatering by evaporation to obtain a pre-swelling solution. The pre-swelling solution had a water/NMMO mass ratio of 16:84.

(3) The pre-swelling solution was subjected to heat preservation in a swelling kettle for sufficient swelling to obtain a swelled solution.

(4) The swelled solution was subjected to dewatering by depressurized evaporation and dissolving to obtain the cellulose solution.

Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 7

A process for preparing a cellulose solution comprises the following steps:

(1) Cellulose pulp and an NMMO aqueous solution of 100° C. were uniformly mixed to obtain a premix. The mass of the NMMO aqueous solution was 10 times that of the cellulose pulp, and the NMMO aqueous solution had a water/NMMO mass ratio of 35:65.

(2) The premix was subjected to dewatering by evaporation to obtain a pre-swelling solution. The pre-swelling solution had a water/NMMO mass ratio of 27:73.

(3) The pre-swelling solution was subjected to heat preservation in a swelling kettle for sufficient swelling to obtain a swelled solution.

(4) The swelled solution was subjected to dewatering by depressurized evaporation and dissolving to obtain the cellulose solution.

Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 8

A process for preparing a cellulose solution comprises the following steps:

(1) Cellulose pulp and an NMMO aqueous solution of 85° C. were uniformly mixed to obtain a premix. The mass of the NMMO aqueous solution was 8 times that of the cellulose pulp, and the NMMO aqueous solution had a water/NMMO mass ratio of 28:72.

(2) The premix was subjected to evaporation dewatering to obtain a pre-swelling solution. The pre-swelling solution had a water/NMMO mass ratio of 19:81.

(3) The pre-swelling solution was subjected to heat preservation in a swelling kettle for sufficient swelling to obtain a swelled solution.

(4) The swelled solution was subjected to depressurized evaporation dewatering and dissolving to obtain the cellulose solution. Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 9

A process for preparing a cellulose solution comprises the following steps:

(1) Cellulose pulp and an NMMO aqueous solution of 90° C. were uniformly mixed to obtain a premix. The mass of the NMMO aqueous solution was 9 times that of the cellulose pulp, and the NMMO aqueous solution had a water/NMMO mass ratio of 29:62.

(2) The premix was subjected to evaporation dewatering to obtain a pre-swelling solution, w The pre-swelling solution had a water/NMMO mass ratio of 20:79.

(3) The pre-swelling solution was subjected to heat preservation in a swelling kettle for sufficient swelling to obtain a swelled solution.

(4) The swelled solution was subjected to dewatering by depressurized evaporation and dissolving to obtain the cellulose solution.

Proven by test, the solution had outstanding uniformity. Under the condition that the prepared cellulose solution was used for spinning by spinning equipment with a draft multiple of 5, the cellulose solution was excellent in spinning stability and was free of broken ends in a period of spinning time of 2 hours.

Embodiment 10

Figure 2:
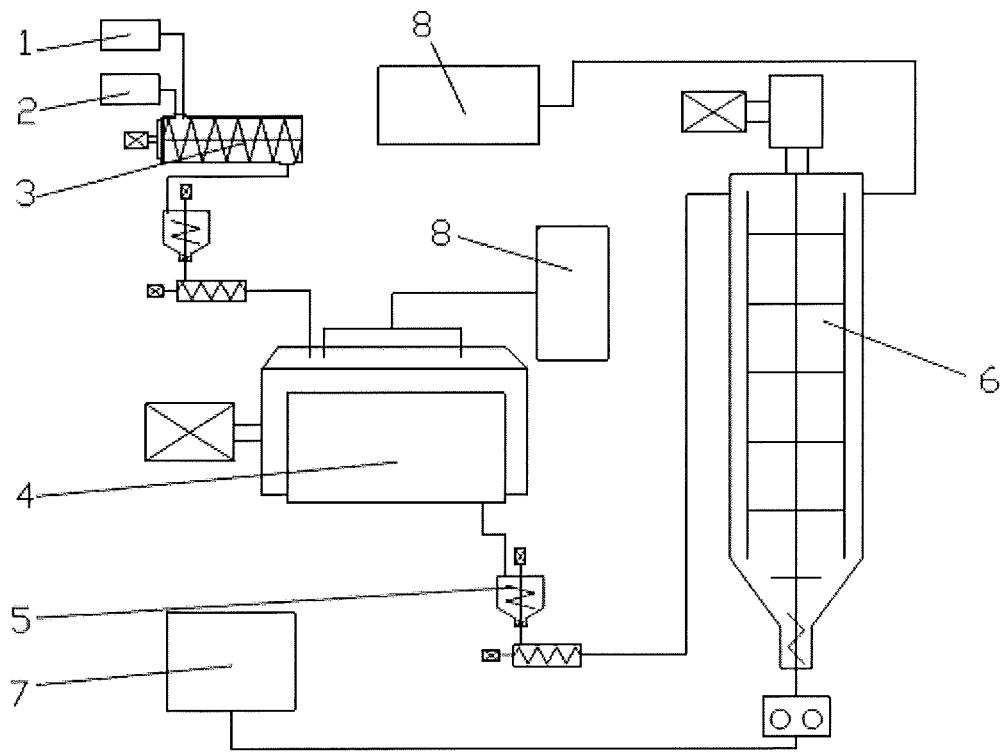
FIG. 2 is a structural schematic diagram of continuous preparation equipment for a cellulose solution of the present invention.

Referring to FIG. 2, continuous preparation equipment for a cellulose solution, provided by the present invention, comprises continuous feeding equipment, a continuous mixer 3, continuous depressurizing and heating equipment 4, a swelling kettle 5 and thin-film-evaporation dissolving equipment 6. Wherein, the continuous feeding equipment comprises a continuous pulp charging device 1 and a continuous NMMO aqueous solution charging device 2, and the continuous pulp charging device 1 and the continuous NMMO aqueous solution charging device 2 are respectively connected with feeding sections of the continuous mixer 3. A discharging end of the continuous mixer 3 is connected with a charging end of the continuous depressurizing and heating equipment 4 through a pipeline. A discharging end of the continuous depressurizing and heating equipment 4 is connected with a charging end of the swelling kettle 5 through a pipeline, and a discharging end of the swelling kettle 5 is connected with a charging end of the thin-film-evaporation dissolving equipment.

The continuous mixer 3 can be equipment with a continuous mixing function, such as a single-shaft continuous mixer, a twin-shaft continuous mixer or a twin-screw kneading-type continuous mixer.

The continuous depressurizing and heating equipment 4 is selected from a continuous mixer equipped with a vacuum heating device. The thin-film-evaporation dissolving equipment 6 can be vertical type thin-film-evaporation dissolving equipment. Each of the continuous depressurizing and heating equipment 4 and the thin-film-evaporation dissolving equipment 6 is connected with a vacuum device 8.

The continuous preparation equipment for the cellulose solution, provided by the present invention, may further comprise molding equipment 7. A charging end of the molding equipment 7 is connected with a discharging end of the thin-film-evaporation dissolving equipment.

The continuous preparation equipment for the cellulose solution may further comprise a storage kettle and a first conveying pump. The storage kettle and the first conveying pump are successively arranged on a pipeline between the continuous mixer 3 and the continuous depressurizing and heating equipment 4.

The continuous preparation equipment for the cellulose solution may further comprise a second conveying pump. The second conveying pump is arranged on a pipeline between the swelling kettle 5 and the thin-film-evaporation dissolving equipment 6.

A specific implementation mode of the continuous preparation equipment for the cellulose solution is as follows:

(1) Cellulose pulp and an NMMO aqueous solution were added into the continuous mixer 3 through the continuous pulp charging device 1 and the continuous NMMO aqueous solution charging device 2 respectively, and were sufficiently and uniformly mixed in the continuous mixer 3 to obtain a premix, and the premix was continuously added into the storage kettle.

(2) The premix in the storage kettle was pumped into the continuous depressurizing and heating equipment 4 through a first conveying pump such that the premix is further intensively stirred and mixed. A stirring component of the continuous depressurizing and heating equipment 4 heat the premix through a contact face, the premix was subjected to dewatering by depressurized evaporation under certain vacuum until a predetermined volume of moisture was evaporated, and thus, an NMMO concentration reached an optimal swelling concentration range to obtain a pre-swelling solution.

(3) The pre-swelling solution was continuously added into the swelling kettle 5 through a pipeline, and was sufficiently swelled under proper temperature conditions after a certain residence time so as to be converted into a swelled solution, and a temperature of an outer jacket of the swelling kettle was regulated and controlled through a heat medium.

(4) The swelled solution was continuously pumped into the thin-film-evaporation dissolving equipment 6 through a second conveying pump, was spread out on the surface of a vertical type internal wall of the thin-film-evaporation dissolving equipment 6 to form a thin layer shape and was further dewatered under proper temperature and vacuum conditions to be converted into a cellulose solution with a concentration of 10% to 15%.

(5) The cellulose solution was added into the molding equipment 7 and could be converted into products such as fibers, films and nonwoven fabrics.

COMPARATIVE EXAMPLE (1) 50 kg of cellulase activated pulp (COSMO DP500, moisture content 53%) and 178 kg of NMMO aqueous solution of 85° C. were stirred for 30 min at a stirring linear speed of 120 m/min to be uniformly mixed to obtain a premix. The NMMO aqueous solution had a water/NMMO mass ratio of 84:16.

(2) The premix was added into a swelling kettle, was heated to a temperature of 85° C., and was subjected to heat preservation for 30 min for sufficient swelling to obtain a swelled solution.

(3) The swelled solution was added into thin-film-evaporation dissolving equipment and was subjected to dewatering by depressurized evaporation and dissolving to obtain a cellulose solution with a cellulose concentration of 12%. The thin-film-evaporation dissolving equipment had a dewatering temperature of 130° C., a dewatering pressure of 10 kPa and a thin-film wiping speed of 4 m/s.

Proven by test, the solution had poorer uniformity as compared with the solutions of the embodiments and had a larger gel-particle particle size. Under the same condition of not being filtered by filtering equipment, and under the condition that the cellulose solution was used for spinning by spinning equipment with a draft multiple of 5, the solution was poorer in spinning stability, and broken ends occurred frequently in a period of spinning time of 2 hours.

The uniformity of the cellulose solution can be characterized through observing the dissolving condition of cellulose in the solution by a polarized microscope and detecting the particle size and particle size distribution of gel particles in the solution by a laser particle size analyzer. The smaller the particle size of the gel particles in the solution is and the narrower the particle size distribution is, the greater the uniformity of the solution is. And when the gel particles in the solution is relatively large in size and relatively wide in particle size distribution, the spinning stability of the solution will be affected, and a thread breaking phenomenon will occur when the draft multiple is relatively large.

| | Solution uniformity | | | Spinning stability |
|---|---|---|---|---|
| | Polarized Microscope | Laser particle size analyzer | | The spinning solution is not filtered by filtering equipment, and is subjected to spinning for 2 hours with a draft multiple of 5 |
| | | D50 um | D90 um | |
| Embodiment 1 | No insolubles | 9 | 30 | Stable spinning, no broken thread |
| Embodiment 2 | No insolubles | 11 | 29 | Stable spinning, no broken thread |
| Embodiment 3 | No insolubles | 8 | 31 | Stable spinning, no broken thread |
| Embodiment 4 | No insolubles | 10 | 28 | Stable spinning, no broken thread |
| Embodiment 5 | No insolubles | 8.5 | 27 | Stable spinning, no broken thread |
| Embodiment 6 | No insolubles | 9.5 | 28 | Stable spinning, no broken thread |
| Embodiment 7 | No insolubles | 8 | 30 | Stable spinning, no broken thread |
| Embodiment 8 | No insolubles | 8.5 | 29 | Stable spinning, no broken thread |
| Embodiment 9 | No insolubles | 10 | 30 | Stable spinning, no broken thread |
| Comparative Example | No insolubles | 35 | 122 | poorer stability, more frequent thread breaking |

It can be observed from the table above that the cellulose solution prepared by the process provided by the present invention is excellent in uniformity and high in spinning stability and is free of a thread breaking phenomenon in 2 hours of spinning.

The embodiments of the present invention are described in detail above, however, the mentioned contents are only preferred embodiments of the present invention and cannot be considered to limit the scope of implementation of the present invention. All equivalent variations, improvements, etc. made according to the scope of application of the present invention should shall all be covered within the scope of the present invention.

The invention claimed is:

1. A process for preparing a cellulose solution, comprising:
   (1) uniformly mixing cellulose pulp and N-methylmorpholine-N-oxide-aqueous solution with a temperature in a range from 70° C. to 100° C. to obtain a premix, wherein a mass of the N-methylmorpholine-N-oxide aqueous solution is 5 to 10 times that of the cellulose pulp, and the N-methylmorpholine-N-oxide aqueous solution has a water to N-methylmorpholine-N-oxide mass ratio in a range from 28:72 to 60:40;
   (2) subjecting the premix to dewatering by depressurized evaporation at a dewatering temperature in a range from 80° C. to 110° C. under a dewatering pressure in a nine from 4 kPa to 10 kPa to obtain a pre-swelling solution, wherein the pre-swelling solution has a water to N-methylmorpholine-N-oxide mass ratio in a range from 16:84 to 28:72;
   (3) subjecting the pre-swelling solution to heat preservation in a swelling kettle, the pre-swelling solution being sufficiently swelled in a temperature in a range from 55° C. to 95° C. for a residence time in a range from 3 min to 60 min to obtain a swelled solution inside the swelling kettle; and
   (4) subjecting the swelled solution to dewater by depressurized evaporation and dissolving to obtain the cellulose solution.

2. The process for preparing the cellulose solution according to claim 1, wherein in step (1), the N-methylmorpholine-N-oxide aqueous solution has the water toN-methylmorpholine-N-oxide mass ratio in a range from 28:72 to 50:50.

3. The process for preparing the cellulose solution according to claim 1, wherein in step (2), the pre-swelling solution has the water to N-methylmorpholine-N-oxide mass ratio in a range from 18:82 to 27:73.

4. The process for preparing the cellulose solution according, to claim 1, wherein in step (1), the mass of the N-methylmorpholine-N-oxide aqueous solution is 8 to 10 times that of the cellulose pulp, and the N-methylmorpholine-N-oxide aqueous solution has a temperature in a range from 80° C. to 90° C.

5. The process for preparing the cellulose solution according to claim 1, wherein in step (1), a process for uniformly mixing the cellulose pulp and the N-methylmorpholine-N-oxide aqueous solution comprises adding the cellulose pulp and the N-methylmorpholine-N-oxide aqueous solution into continuous mixing equipment and carrying out continuous mixing for 5 min to 30 min at a stirring linear speed in a range from 60 m/min to 80 m/min.

6. The process for preparing the cellulose solution according to claim 1, wherein in step (4), a process for dewatering by depressurized evaporation and dissolving is thin-film-evaporation dewatering and dissolving and is carried out at a, dewatering temperature in a range from 100° C. to 150° C. under a dewatering pressure in a range from 4 kPa to 10 kPa at a thin-film wiping linear speed in a range from 2 m/s to 6 m/s.

7. The process for preparing the cellulose solution according to claim 1, wherein in step (1), the N-methylmorpholine-N-oxide aqueous solution has the water to N-methylmorpholine-N-oxide mass ratio in a range from 28:72 to 35:65.

8. The process for preparing the cellulose solution according to claim 1, wherein in step (2), the pre-swelling solution has the water to N-methylmorpholine-N-oxide mass ratio in a range from 19:81 to 25:75.

9. The process for preparing the cellulose solution according to claim 1, wherein in step (3), the pre-swelling solution is sufficiently swelled in a temperature in a range from 65° C. to 95° C. for a residence time in a range from 10 min to 45 min to obtain a swelled solution inside the swelling kettle.

10. The process for preparing the cellulose solution according to claim 1, wherein in step (3), the pre-swelling solution is sufficiently swelled in a temperature in a range from 75° C. to 85° C. for a residence time in a range from 15 min to 30 min to obtain a swelled solution inside the swelling kettle.

* * * * *